United States Patent
Rognli et al.

(10) Patent No.: US 11,916,388 B2
(45) Date of Patent: Feb. 27, 2024

(54) DISCONNECT LOAD CONTROL RECEIVER FOR RESISTIVE HEATING LOADS

(71) Applicant: Eaton Intelligent Power Limited, Dublin (IE)

(72) Inventors: Roger W. Rognli, Otsego, MN (US); Jesse Walter, Woodbury, MN (US); Karl Slingsby, Plymouth, MN (US); Ryan F. Brager, Maple Grove, MN (US)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 17/798,783

(22) PCT Filed: Feb. 10, 2021

(86) PCT No.: PCT/EP2021/025045
§ 371 (c)(1),
(2) Date: Aug. 10, 2022

(87) PCT Pub. No.: WO2021/160343
PCT Pub. Date: Aug. 19, 2021

(65) Prior Publication Data
US 2023/0092550 A1    Mar. 23, 2023

Related U.S. Application Data

(60) Provisional application No. 62/972,394, filed on Feb. 10, 2020.

(51) Int. Cl.
*H02J 3/14* (2006.01)
*F24H 15/148* (2022.01)
(Continued)

(52) U.S. Cl.
CPC ............ *H02J 3/144* (2020.01); *F24H 15/148* (2022.01); *F24H 15/152* (2022.01);
(Continued)

(58) Field of Classification Search
CPC .......... H02J 3/144; H02J 2310/54; H02J 3/14; F24H 15/152; F24H 15/168; F24H 1/202;
(Continued)

(56) References Cited

U.S. PATENT DOCUMENTS 4,292,813 A   10/1981   Paddock
7,242,114 B1   7/2007   Cannon et al.
(Continued)

FOREIGN PATENT DOCUMENTS

EP         3 508 799 A1    7/2019
WO   WO 2019/222580 A1   11/2019
WO       2021001060 A1    1/2021

OTHER PUBLICATIONS

PCT International Search Report for PCT/EP2021/025045, filed Feb. 10, 2021, dated Apr. 6, 2021, 4 pages.
(Continued)

*Primary Examiner* — Kidest Bahta
(74) *Attorney, Agent, or Firm* — DiBerardino McGovern IP Group LLC

(57) ABSTRACT

An electrical power distribution control system configured to issue a demand response signal to cut power to a plurality of electrical power consuming loads within an electrical power distribution network to reduce a peak power demand within an electrical power grid during a peak power demand. Unlike conventional demand response systems, the controller in each consumer residence includes both a distributed control based on the ability to track individual 24 hour usage patterns and selectively delay the demand response signal on individual resistive heating loads based on usage patterns for
(Continued)

the purpose of reducing a likelihood of consumers experiencing effects of the reduced peak power demand.

21 Claims, 10 Drawing Sheets

(51) Int. Cl.

| | | |
|---|---|---|
| *F24H 15/152* | (2022.01) | |
| *F24H 15/156* | (2022.01) | |
| *F24H 15/164* | (2022.01) | |
| *F24H 15/168* | (2022.01) | |
| *F24H 15/174* | (2022.01) | |
| *F24H 15/37* | (2022.01) | |
| *F24H 15/45* | (2022.01) | |
| *F24D 19/10* | (2006.01) | |
| *F24H 9/28* | (2022.01) | |
| *F24H 15/124* | (2022.01) | |
| *F24H 15/225* | (2022.01) | |
| *F24H 15/281* | (2022.01) | |
| *F24H 15/414* | (2022.01) | |

(52) U.S. Cl.
CPC ......... *F24H 15/156* (2022.01); *F24H 15/164* (2022.01); *F24H 15/168* (2022.01); *F24H 15/174* (2022.01); *F24H 15/37* (2022.01); *F24H 15/45* (2022.01); *F24D 19/1006* (2013.01); *F24H 9/28* (2022.01); *F24H 15/124* (2022.01); *F24H 15/225* (2022.01); *F24H 15/281* (2022.01); *F24H 15/414* (2022.01)

(58) Field of Classification Search
CPC .... Y02B 30/70; Y02B 70/30; Y02B 70/3225; F24D 19/1006; Y02P 80/10; Y04S 20/222; Y04S 20/244
See application file for complete search history.

(56) References Cited

U.S. PATENT DOCUMENTS

| | | |
|---|---|---|
| 7,355,301 B2 | 4/2008 | Ockert et al. |
| 7,528,503 B2 | 5/2009 | Rognli et al. |
| 7,702,424 B2 | 4/2010 | Cannon et al. |
| 9,461,470 B2 | 10/2016 | Cox |
| 10,295,292 B2 | 5/2019 | Ding et al. |
| 2003/0036820 A1* | 2/2003 | Yellepeddy ....... H02J 13/00034 700/36 |
| 2012/0010757 A1* | 1/2012 | Francino ................ G05B 15/02 700/291 |
| 2013/0125572 A1 | 5/2013 | Childs et al. |
| 2013/0144452 A1* | 6/2013 | Takakura ............... G05B 11/01 700/291 |
| 2016/0010879 A1 | 1/2016 | Rognli et al. |
| 2016/0216007 A1 | 7/2016 | Harbin, III et al. |

OTHER PUBLICATIONS

PCT Written Opinion of the ISA for PCT/EP2021/025045, filed Feb. 10, 2021, dated Apr. 6, 2021, 9 pages.

\* cited by examiner

DISCONNECT LOAD CONTROL RECEIVER FOR RESISTIVE HEATING LOADS

RELATED APPLICATION INFORMATION

This application is a National Phase entry of PCT Application No. PCT/EP2021/025045, filed Feb. 10, 2021, which application claims the benefit of priority to U.S. Provisional Application No. 62/972,394, filed Feb. 10, 2020, the entire disclosures of which are incorporated herein by reference.

TECHNICAL FIELD

The present disclosure relates generally to alternating current electrical power distribution control methods, and more particularly to an electrical power distribution control system configured to manage the peak power demand within an electrical power grid while minimizing effects on consumers of one or more disconnect load control receivers for resistive heating loads such as water heaters.

BACKGROUND

Distribution of alternating current (AC) power via an electric network or power grid that consists of transmission and distribution circuits is typically controlled by an electric control system. Various components and subsystems within the electrical power grid may communicate with and be controlled by a centralized electrical power distribution control system, for example. Due to the large scale and variety of electrical sources and loads in most electrical power grids, the centralized management of the generation and transmission of AC electrical power by electric utility companies is an expansive and complex management problem.

In particular, utilities need to match generation to load, or supply to demand. Traditionally, this is done on the supply side using Automation Generation Control (AGC). As loads are added to an electric power grid and demand rises, utilities increase output of existing generators to solve increases in demand. To solve the issue of continuing long-term demand, utilities typically invest in additional generators and plants to match rising demand. As load levels fall, generator output to a certain extent may be reduced or taken offline to match falling demand. As the overall demand for electricity grows, the cost to add power plants and generation equipment that serve only to fill peak demand becomes extremely costly.

In response to the high cost of peaking plants, electric utility companies have developed solutions and incentives aimed at reducing both commercial and residential demand for electricity. In the case of office buildings, factories and other commercial buildings having relatively large-scale individual loads, utilities often incentivize owners with differential electricity rates to install locally controlled load-management systems that reduce overall demand on the electrical power grid. In the case of individual residences having relatively small-scale electrical loads, utilities incentivize some consumers to allow them to install demand-response technology at the residence to control high energy usage appliances. Such efforts aid the utilities in easing demand during sustained periods of peak usage.

As a further aid in reducing energy consumption during sustained periods of peak usage, utilities have developed demand response technology to selectively limit power to certain types of individual residential electrical power consuming loads (e.g., air-conditioning units, etc.) during periods of peak usage. Traditional demand-response technology used to manage individual resident loads typically consists of a load-control switch (LCS) device. Such LCS devices, which can be wired into the control circuit of the load or power supply line of another electrical load, receive commands over a long-distance communications network to interrupt power to the load when the load is to be controlled. Examples of current demand-response schemes are shown in U.S. Pat. Nos. 9,461,470 and 10,295,292, as well as PCT Publ. Appl. No. WO2019222580A1. While traditional demand response schemes serve to reduce the demand for electrical power during peak times, such schemes generally do not affect an actual decrease in overall energy usage. Instead of trying to make the electrical loads more efficient like is done for five star energy efficient appliances, for example, the demand for energy is merely pushed by the demand response scheme to another time along the utility demand timeline.

Historically, traditional demand response schemes were implemented over a relatively short period of time (e.g., 4 hours) to coincide with peak power demands within a conventional electrical power grid. More recently, the periods of time during which peak power demands generally occur have extended in length, in some cases lasting 8-hours or more. Where it was traditionally easier for utilities to hide from consumers the fact that they were selectively limiting power to residential loads during the shorter periods of time, the increased duration of peak power demand cycles and corresponding demand response schemes has resulted in a greater number of customers being aware of the impact of such demand response schemes in that the outputs of the respective loads are failing to meet consumer expectations, especially for resistive heating loads such as water heaters.

Effective regulation of AC electrical power within the power grid is further exacerbated by the addition of Distributed Energy Resources (DERs) (e.g., photovoltaics, solar-thermal systems, wind, biomass, and geothermal power sources, etc), which add a generally predictable but often irregular supply of electrical power to the power grid over the course of a day, which typically does not align with the daily demand. Traditionally, power distribution was a one-way transmission of power from a central power plant or system of power plants to a grid of connected customers, each of whom is associated with an electrical load. Increasingly, power is supplied to power grids from DERs, which provide a voltage boost to the grid wherever they are connected. In small quantities, DERs can reduce the power required of a base load generator such as a power plant. As such, DERs are seen as a mechanism for achieving reduced greenhouse gas emissions, and, if implemented properly, a mechanism for reducing load on the electrical grids in which they are deployed.

Unfortunately, conventional power grid designs based on power provided by traditional generators and plants are often ill equipped to deal with the ramifications of significant levels of DER power generation. In areas where DER power generation exceeds a certain threshold, the power generated by DERs, either alone or in combination with power provided by a base plant, can exceed the demand for power amongst the loads on that portion of the grid. Such an oversupply of power can cause so-called "upstream" current flow, away from the DERs and loads and towards the power plant. Conventional power grids were not designed to accommodate an upstream current flow, and often this scenario results in either overvoltage at the area of the grid having DERs, or disconnection of the DERs from the grid entirely. The inability of conventional power grids to handle power supplied by DERs in excess of the power draw required by the load has caused some utilities to throttle the implementation of renewable technologies.

Even where the power output level of DERs is low enough that upstream current flow does not occur, the use of DERs, whose output can vary significantly based on sunlight, weather, and other factors, can create complex patterns with sudden decreases in power generation. When the overall power generated by the electrical grid fails to meet the load demand, the use of expensive, peak load generation devices is required. There is a need to address these various concerns associated with power distribution control systems that include DERs and have longer and flatter peak power usage demands.

SUMMARY OF THE DISCLOSURE

Embodiments of the present disclosure provide an electrical power distribution control system configured to enable utilities to selectively control a flow of electrical power to resistive heating loads within the electrical power grid for the purpose of shifting power consumption of those loads to other times during the power demand continuum, thereby reducing a total power demand of the power grid during times of longer and flatter peak usage demands, while minimizing effects on consumers.

One embodiment of the present disclosure provides an electrical power distribution control system configured to issue a demand response signal to cut power to a plurality of resistive heating loads within an electrical power distribution network to reduce the peak power demand within an electrical power grid. Unlike conventional demand response systems, the controller in each consumer residence includes both a distributed control based on the ability to track individual 24 hour usage patterns and selectively delay the demand response signal on individual resistive heating loads based on usage patterns for the purpose of reducing a likelihood of consumers experiencing effects of the reduced peak power demand. The electrical power distribution system can include at least one disconnect load control receiver (DLCR) and a controller. The at least one DLCR can be operably coupled to at least one resistive heating load of the plurality of electrical power consuming loads within the electrical power grid. The controller can be configured to communicate with the at least one DLCR to cut power to the at least one resistive heating load to reduce power consumption within the electrical power grid during a peak power demand. The at least one DLCR can be configured to monitor actual power consumption data of the at least one resistive heating load for the generation of a 24-hour power consumption demand model for the at least one resistive heating load. The DLCR can be configured to selectively overwrite the demand response signal to manage the flow of electrical power to the at least one resistive heating load based on the 24-hour power consumption demand model to reduce a likelihood of consumers observing a decrease in an output of the at least one resistive heating load as a result of the demand response signal.

In one embodiment, the at least one resistive heating load is a resistive water heater. In one embodiment, the controller uses the 24-hour power consumption demand model to forecast an expected output consumer demand for the at least one resistive heating load over the 24-hour period. In one embodiment, the selective managing of the flow of electrical power to the at least one resistive heating load is constrained by a deferred run time limit, representing a computed maximum time delay permissible to achieve a minimum consumer satisfaction threshold of the at least one 1 resistive heating load over the 24-hour period.

In one embodiment, the at least one resistive heating load is a resistive water heater, and the minimum consumer satisfaction threshold is for the resistive water heater has a goal of continuously maintaining a desired water output temperature of at least an establish minimum temperature over the 24-hour period. In one embodiment, the deferred run time limit is, at least in part, a function of a water heater capacity, a difference between a desired water output temperature and a water source temperature, and a consumer adjustable safety margin. In one embodiment, the consumer adjustable safety margin is adjustable via a mobile computing device.

In one embodiment, the DCLR is configured to selectively defer energy usage to a lower cost per unit time during a 24-hour period. In one embodiment, the electrical power grid further includes one or more distributed energy resource configured to generate an additional supply of electrical power, and the DLCR is configured to selectively defer energy usage to artificially create an energy demand during times of excess power generation within the electrical power grid.

In one embodiment, the 24-hour power consumption demand model generated by the DLCR is a moving average of the actual power consumption data collected over a plurality of 24-hour periods. In one embodiment, the moving average is a weighted moving average, where the actual power consumption data collected over a recent 24-hour period is weighted to place at least one of a greater or lesser importance to the actual power consumption data over the recent 24-hour period. In one embodiment, the 24-hour power consumption demand model is adjustable to reflect known times during future 24-hour periods where a minimum consumer satisfaction threshold of the at least one load need not be met and the at least one load can be operated according to a lower maintenance threshold.

Another embodiment of the present disclosure provides an electrical power distribution control system configured to regulate at least one resistive water heater to reduce power consumption within an electrical power grid during a peak power demand while minimizing effects on consumers. The electrical power distribution system can include at least one DLCR and a controller. The at least one DLCR can be operably coupled to at least one resistive water heater. The controller can be configured to communicate with the at least one DLCR. The at least one DLCR can be configured to communicate actual power consumption data of the at least one resistive water heater to the controller for the generation of a 24-hour power consumption demand model. The controller can be configured to use the 24-hour power consumption demand model to forecast an expected output consumer demand for the at least one resistive water heater over a 24-hour period and to instruct the DLCR to selectively manage a flow of electrical power to the at least one resistive water heater to meet the expected output consumer demand over the 24-hour period, while still reducing overall power consumption within the electrical power grid during a peak power demand.

Yet another embodiment of the present disclosure provides a method of reducing peak power demand within an electrical power grid while minimizing effects on consumers, including the steps of: establishing a communication link between at least one DLCR and a controller, the DLCR operably coupled to at least one load within the electrical power grid; receiving actual power consumption data of the at least one load from the DLCR; generating of a 24-hour power consumption demand model based on the received actual power consumption data; forecasting an expected output consumer demand for the at the least one load over a 24-hour period; and instructing the DLCR to selectively limit a flow of electrical power to the at least one load according to a demand response signal to reduce power consumption within the electrical power grid during a peak power demand; and overriding the demand response signal to manage a flow of electrical power to the at least one resistive heating load based on the 24 hour power consumption demand model to reduce a likelihood of consumers observing a decrease in output of the at least one resistive heating load as a result of the demand response signal.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
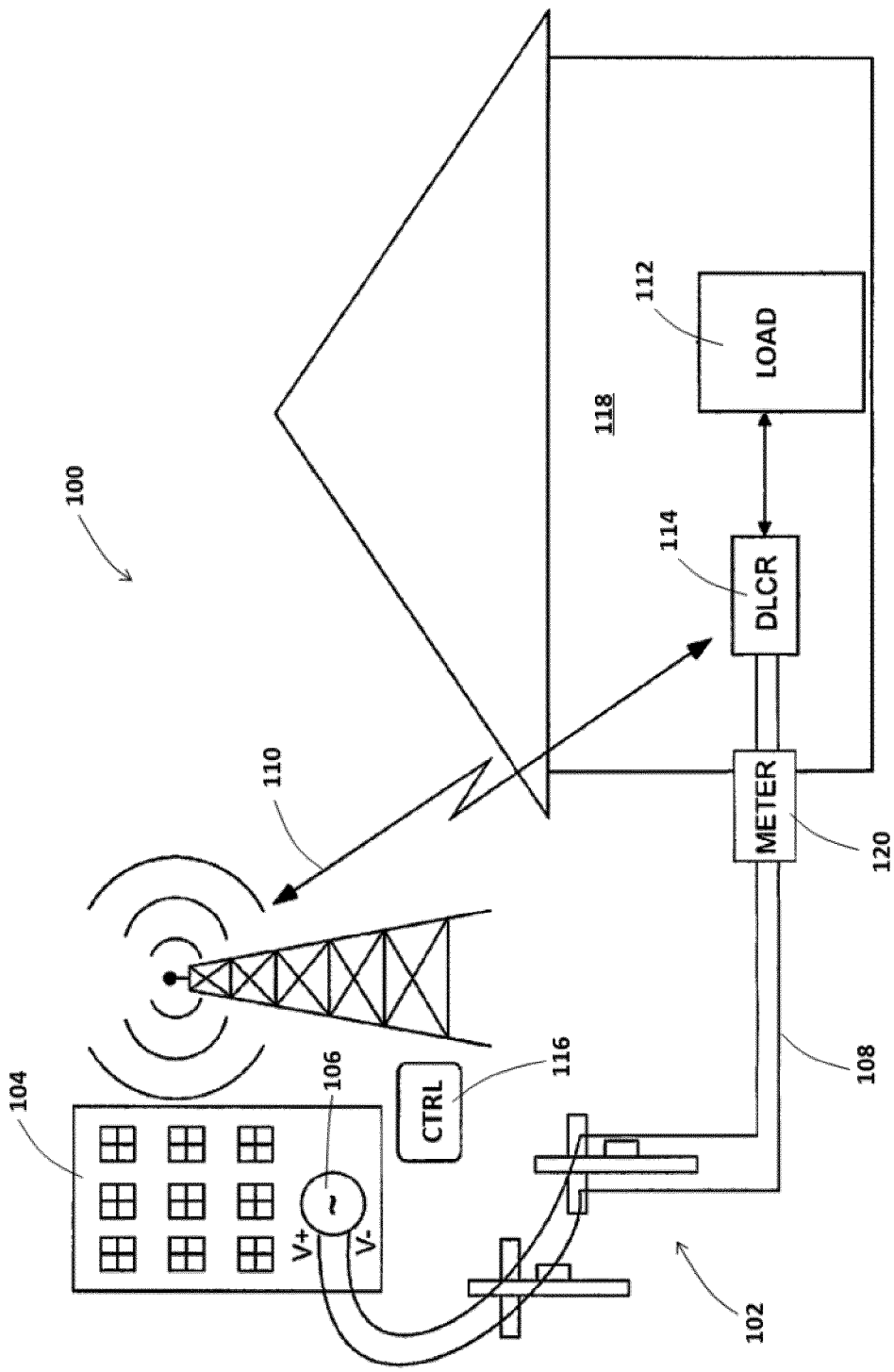
FIG. 1 is a schematic diagram illustrating an electrical power distribution control system, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an electrical power distribution control system 100 configured to optimize line voltage and reduce a peak power demand within an electrical power grid 102 is depicted in accordance with an embodiment of the disclosure. The electrical power grid 102 generally includes a master station 104, electrical power generator 106, electrical power distribution network 108, long-distance/long-haul communications network 110, and a plurality of electrical power consuming loads 112 that include resistive heating loads such as water heaters. The electrical power distribution control system 100, electrically couples to the electrical power grid 102, and generally includes at least one disconnect load control receiver (DLCR) 114 and a controller 116 configured to communicate with one another via the long-distance/long-haul communications network 110.

In one embodiment, the master station 104 can comprise the utility or power company headquarters and can originate signals or commands to regulate the electrical energy supply demanded by the aggregation of the plurality of loads 112. As depicted, the electrical power generator 106 can be co-located with and under the direction of the master station 104. In other embodiments, there may be a plurality of electrical power generators, which need not be co-located with the master station 104. In some embodiments, the electrical power generator 106 can be in the form of a plant configured to convert coal, natural gas, wind, solar, hydroelectric, or biomass into a usable source of electrical energy for the power grid 102.

The electrical power distribution network 108 is configured to carry electricity from the electrical power generator 106 to the appropriate loads 112. In one embodiment, the electrical power distribution network 108 generally comprises power lines. The electrical power distribution network 108 can further include substations, pole mounted transformers, and distribution wiring.

The long-distance/long-haul communications network 110 is configured to carry signals or commands originated by the controller 116 to the appropriate component or components (e.g., the DLCRs 114) within the distribution control system 100, and to carry signals from the appropriate component or components within the distribution system 100 to the controller, to effect two-way communications. In some embodiments, the long-haul two-way communication interface protocol can include, but is not limited to, radiofrequency node (RFN) communications, an Itron® mesh network, Sensus Flexnet, Cellnet, IEEE 802.15.4, AERIS/TELMETRIC Analog Cellular Control Channel communications, SMS digital communications, or DNP Serial compliant communications for integration with SCADA/EMS communications. Other wired or wireless communication protocols may be employed including, but not limited to, ZigBee®, Bluetooth®, Wi-Fi, and others.

Figure 2:
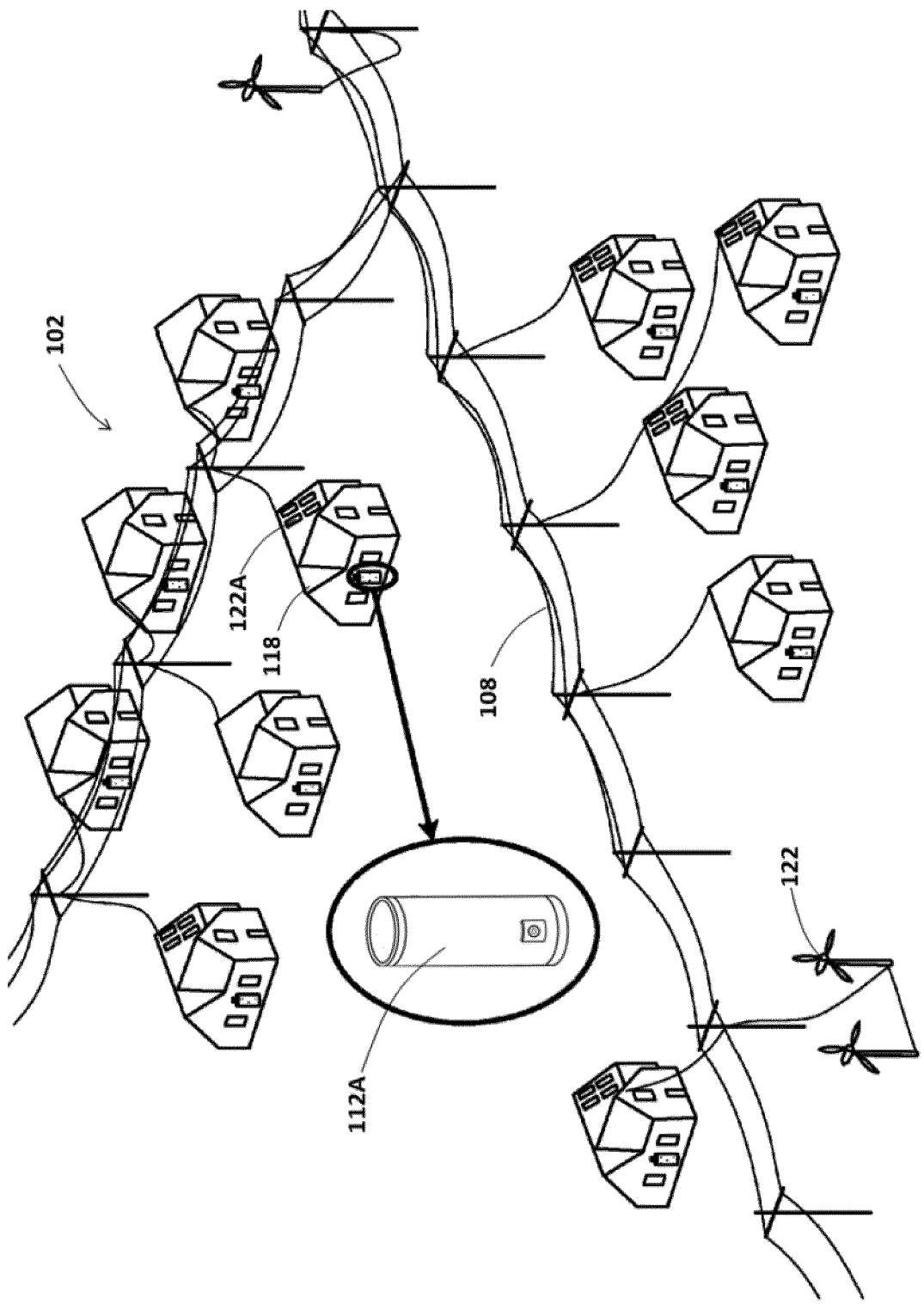
FIG. 2 is a schematic diagram partially depicting an electrical power grid, in accordance with an embodiment of the disclosure

As depicted in FIGS. 1-2, the electrical power consuming loads 112, are co-located with residences 118. In other embodiments, the residential homes 118 themselves, which can each include a plurality of energy consuming devices and systems, can be considered the loads. It should be understood that while FIGS. 1-2 depict residences 118, in other portions of the power grid 102 there can be other loads 112, such as industrial or commercial loads.

In one embodiment, the load 112A is operably coupled to a DLCR 114; thereby enabling the controller 116 to selectively turn on and off, or otherwise limit a flow of electrical power to the load 112A. As depicted in FIG. 2, in one embodiment, the load 112A can be a resistive water heater (e.g., residential hot water heater, heat pump water heater, spa and/or pool heater, etc.); although other embodiments for distributively managing demand response for other types of loads including AC compressors, pool pumps, and rechargeable batteries for electric vehicles are also contemplated.

A relatively constant, high voltage source of electrical power for the power grid 102 can be generated by the electrical power generator 106. The electrical power can be transmitted from the electrical power generator 106 to the electrical power consuming loads 112 via electrical power distribution network 108. In some embodiments, the voltage transmitted throughout the power distribution network 108 can be stepped down via one or more substations and pole mounted transformers prior to reaching the loads 112. In some embodiments, actual electricity consumption of any load 112 or residence can be measured by an electricity meter 120. The electricity meter 120 can be a standard non-communicative device, or may be a "smart meter" tied into an Advanced Metering Infrastructure (AMI) or an electricity "smart grid," capable of communicating with the controller 116 over the long-haul communication network 110, and in some cases capable of communicating with one or more local devices (e.g., a DLCR 114) via a short-haul communication network at or near the load 112.

In one embodiment, the electrical power grid 102 can further include one or more Distributed Energy Resources (DERs) 122 (e.g., photovoltaics, solar-thermal systems, wind, biomass, and geothermal power sources, etc). In the example depicted in FIG. 2, DER 122A is in the form of a photovoltaic cell 122, which based on the amount of sunlight and/or cloud cover can add a generally predictable but often irregular supply of electrical power to the power grid 102 over the course of a day. Residences 118 that produce more electricity than they use are able to sell the excess energy back into the grid 102. However, beyond a certain threshold, the addition of an irregular supply of electrical power to the power grid 102 from multiple DERs 122 can create challenges with grid maintenance, particularly when the supply of electrical power via the DERs 122 over the course of the day is not aligned with the daily load demand.

As such, there may be times when the DERs 122 are producing electrical power in excess of the demand, which if unregulated, can result in an overvoltage in an area of the grid 102 having DERs 122. At other times, power generation within the electrical grid 102 may be matched to the low demand, only to have a sudden onset of cloud cover obscure the sun and significantly reduce the output of the photovoltaics 122A, thereby causing a power generation deficiency, which can require the use of expensive, peak load generation devices. Moreover, one of the leading problems with DERs 122 (primarily in the form of photovoltaics) is the tapering off of electrical power generation in the evening, while a demand for power at that same time of day simultaneously increases. As a result, the electrical power generators 106 must rapidly ramp up production to close the gap between the diminishing supply and increasing demand.

Figure 3:
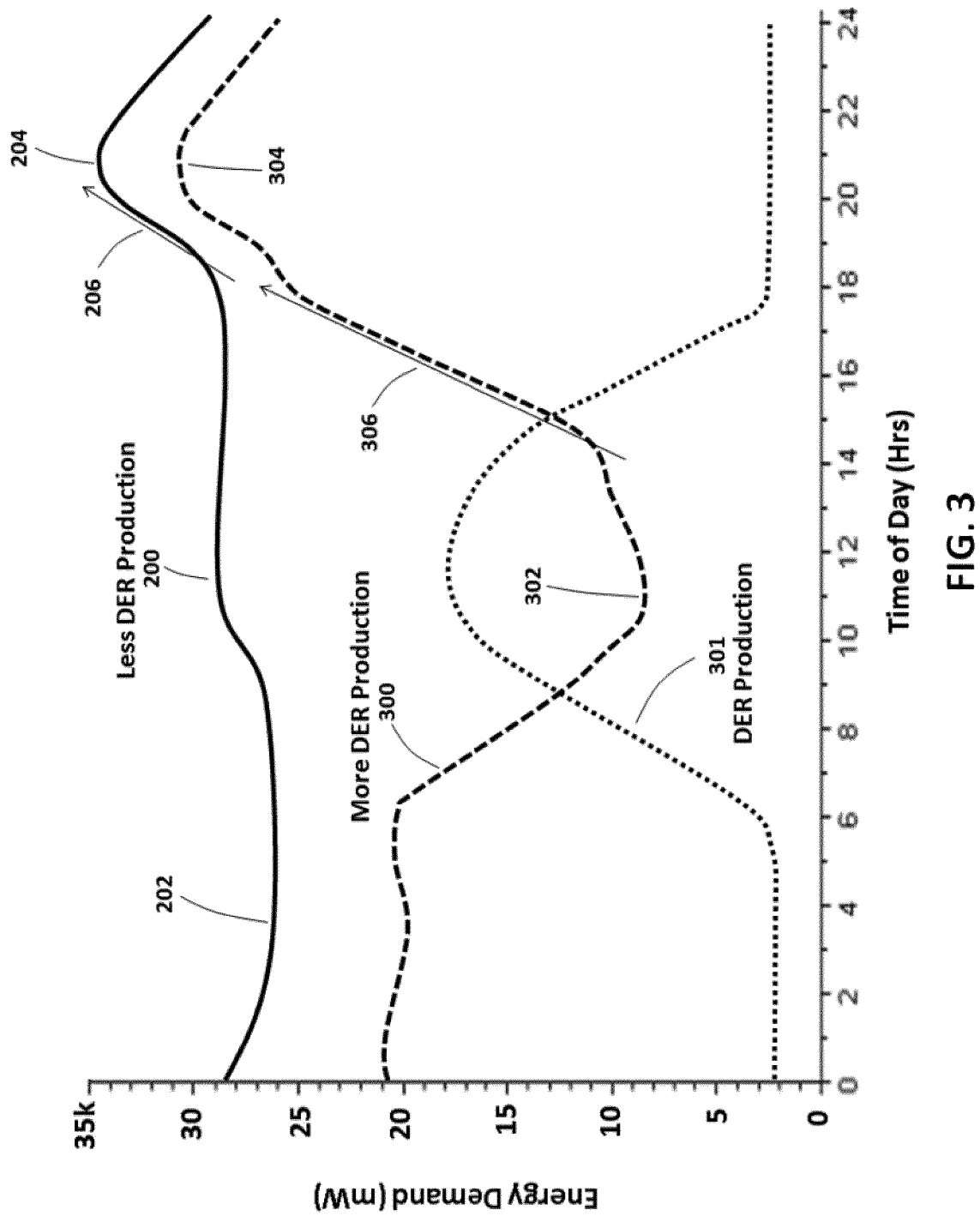
FIG. 3 is a graphical representation of a conventional electrical power demand curve and alternative electrical power demand curve, in accordance with the disclosure.

FIG. 3 depicts a conventional demand curve 200, graphically representing the electrical power demand over the course of a 24-hour period. As depicted, the y-axis represents the overall power demand in megawatts, while the x-axis represents the time of day. In the conventional demand curve 200, power consumption follows a fairly smooth curve, with the lowest demand 202 generally occurring before sunrise (e.g., at about 4 AM) and peak demand 204 occurring in the evening (e.g., at about 7 PM). The graphical representation further shows the highest ramp rate 206, or rate at which the power supply must be increased most rapidly during the day, occurring in the evening (e.g., between about 5 PM and about 7 PM), as a greater number of consumers begin using hot water, activating AC compressors, recharging electric vehicles, etc. Accordingly, power consumption according to the conventional demand curve 200 is similar to a daily repeating sinusoidal wave, with daily and seasonal variations due to changing sunlight, temperature, day of the week, etc.

FIG. 3 further depicts an alternative demand curve 300, as a result of the introduction of the additional power 301 generated by DER power sources. As depicted, the alternate demand curve 300 is shaped quite differently than the conventional demand curve 200, as it corresponds to a grid 102 that includes a substantial quantity of DER 122 power sources. DERs such as solar and wind typically create more energy during daylight hours and less energy at night, as the energy received from the sun decreases. The alternate demand curve 300 graphically depicts the effect that the addition of power 301 from DERs has on the conventional demand curve 200, as midday generation more than offsets an increase in power usage, resulting in a trough midday (e.g., between about 6 AM and about 5 PM).

Grid managers sometimes refer to the alternate demand curve 300 as a "duck curve," as in some exaggerated cases, the curve 300 can appear similar to the outline of a duck's back, with the tail of the duck representing an early morning peak (e.g., at around 6 AM) and the head of the duck representing an evening peak (e.g., at around 7 PM). Although the use of DER power sources reduces the conventional energy production requirements of a power grid 102 (e.g., via traditional power plants 106), while at the same time reducing greenhouse gas emissions, the exaggeration of the alternative demand curve 300 (in comparison to the conventional demand curve 200) presents a significant management problem in attempting to match electrical power production to load demand.

In particular, as can be seen in the alternate demand curve 300, the lowest demand 302 generally occurs in the late morning (e.g., at about 11 AM), and represents a significant decrease in overall power demand in comparison to the lowest demand 202 of the conventional demand curve 200. Like the peak demand 204 of the conventional demand curve 200, the peak demand 304 of the alternate demand curve 300 also generally occurs in the evening (e.g., at about 9 PM). Although the peak demand 304 of the alternate demand curve 300 is slightly less than the peak demand 200 of the conventional demand curve 200, the highest ramp rate 306 (e.g., extending between about 3 PM and about 9 PM) is both steeper and longer than the highest ramp rate 206 of the conventional demand curve 200.

As a result, the power output of traditional power plants 106 must be drawn down (or taken off-line) to accommodate the lower lowest demand 302, and rapidly ramped up in the early afternoon to accommodate the more exaggerated ramp rate 306 of the alternate demand curve 300. When the slope of the ramp rate 306 exceeds a certain rate and traditional power plants 106 are unable to keep up with demand, expensive peak generation systems may need to be activated (or more power may need to be purchased from other suppliers, often at a higher rate).

Traditional power plants 106 are most efficient when they are run at a constant output, 24-hours a day. However, utilities need to manage the electrical power oversupply within the grid 102. Rapidly changing the output of the power plant 106, or taking the power plant 106 off-line, has an adverse economic impact on the electrical power grid 102; moreover, many power plants 106 are under a contract to operate 24-hours a day. Although, DERs 122 can be selectively taken off-line, wasting renewable energy sources (e.g., solar power) in favor of power produced by traditional methods (e.g., via coal or natural gas plants) does not represent a viable long-term solution.

Embodiments of the present disclosure reduce the difference between the lowest demand 302 and the highest demand 304, thereby reducing the slope of the ramp rate 306, and the corresponding rate at which traditional power plants 106 must increase production to keep up with demand. In particular, the electrical power distribution control system 100 of the present disclosure can apply "peak shaving" or "load shedding" during times when usage is highest, by reducing peak power usage through the selective limiting of the run time of certain loads 112 via one or more DLCRs 114. Peak shaving by embodiments of the present disclosure, thus flatten the top of the power consumption curve 300, thereby delaying some of the power draw until after peak consumption begins to draw down.

Figure 4:
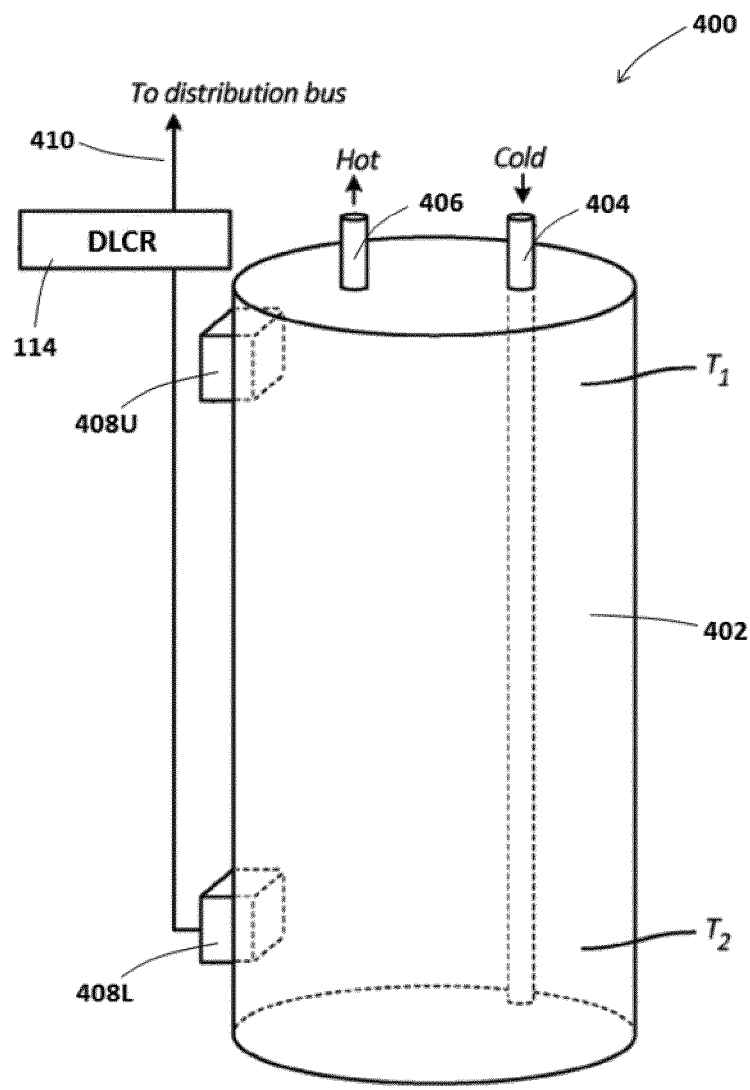
FIG. 4 is a schematic perspective view depicting a resistive water heater and disconnect load control receiver, in accordance with an embodiment of the disclosure.

With reference to FIG. 4, a simplified perspective view of a resistive water heater 400 (exemplifying a representative load 112A of power grid 102 as depicted in FIG. 2) is depicted in accordance with an embodiment of the disclosure. In an embodiment, the resistive water heater 400 includes a tank 402 coupled to a water line via a cold-water input 404 and provides hot water via hot-water output 406. The resistive water heater 400 includes a lower heating package 408L and an upper heating package 408U. Each of the water heating packages 408L/U are connected to a power line 410 via a DCLR 114. The power line 410 is connected to the electrical power distribution network 108 (as depicted in FIGS. 1-2), for example, via an intervening transformer. It should be understood that resistive water heater 400 has been simplified for clarity; for example, tank 402 may further include safety pressure relief systems and/or water draining systems that are not directly impacted by the systems described herein.

To aid in description of water heating system 500, directional labels such as "top" and "bottom" or "upper" and "lower" are used. It should be understood that these labels are with reference to an implied gravitational reference frame. As shown in FIG. 4, the "top" is at the top of the page and the "bottom" is at the bottom of the page. These directions are useful in describing the function of the resistive water heater 400, wherein stored hot water rises while stored cold water falls, with respect to gravity. In other embodiments, other reference frames may be used, and the reference frame described herein should not be construed to limit the invention, as there are other orientations and reference frames that are usable to accomplish the same or similar results.

Like conventional water heater tanks, tank 402 is configured to hold a certain quantity of hot water (often 20-100 gallons) ready for use in a residential setting. In operation, the water contained by tank 402 is thermally stratified; that is, the water at the top of tank 402 will be at a relatively higher temperature (indicated as temperature $T_1$), while the water at the bottom of tank 502 will be at a relatively lower temperature (indicated as temperature $T_2$).

Cold water is introduced at cold water input 404, which is attached to a water source (such as a municipal water line or a well) to provide a supply of cold water. To promote the thermal stratification of the water held by tank 402, the cold-water input 404 routes the incoming cold water to the bottom of tank 402. As shown in FIG. 4, the cold-water input 404 is a dip tube. Similarly, the hot water output 406 promotes the thermal stratification of tank 402 by removing hot water from a location near the top of tank 402. Typically, as the hot water output 406 draws water from tank 402, a substantially equivalent quantity of cold water is introduced at the bottom of tank 402 by the cold-water input 404.

In some embodiments, as cold water is introduced to the bottom of the tank 402, the lower heating package 408L will call for heat and energize the bottom element (assuming that the top element is not heating). While the lower heating package 408L does most of the water heating work, the upper heating package 408U can be used to respond to an extended hot water draw. The upper heating package 408U thus provides for fast recovery.

The lower heating package 408L and the upper heating package 408U typically both include resistive heaters configured to heat water in tank 402, as well as thermostats. In alternative embodiments, heat pumps or other heating systems could be used instead of or in addition to resistive heating elements. The lower heating package 408L and upper heating package 408U typically will not operate their resistive heaters at the same time, to prevent overloading the circuit from which resistive water heater 400 draws power. Rather, upper heating package 408U is configured to heat the water stored in the upper portion of tank 402 until the temperature $T_1$ in that region reaches a preset value (e.g., between about 120° and about 160° F.). Once temperature $T_1$ reaches that preset value, the lower heating package 408L is configured to heat the water stored in the lower portion of tank 402 until the temperature $T_2$ in that region reaches a second preset value (e.g., between about 90° and about 140° F.), often lower than the preset value for temperature $T_1$.

Figure 5:
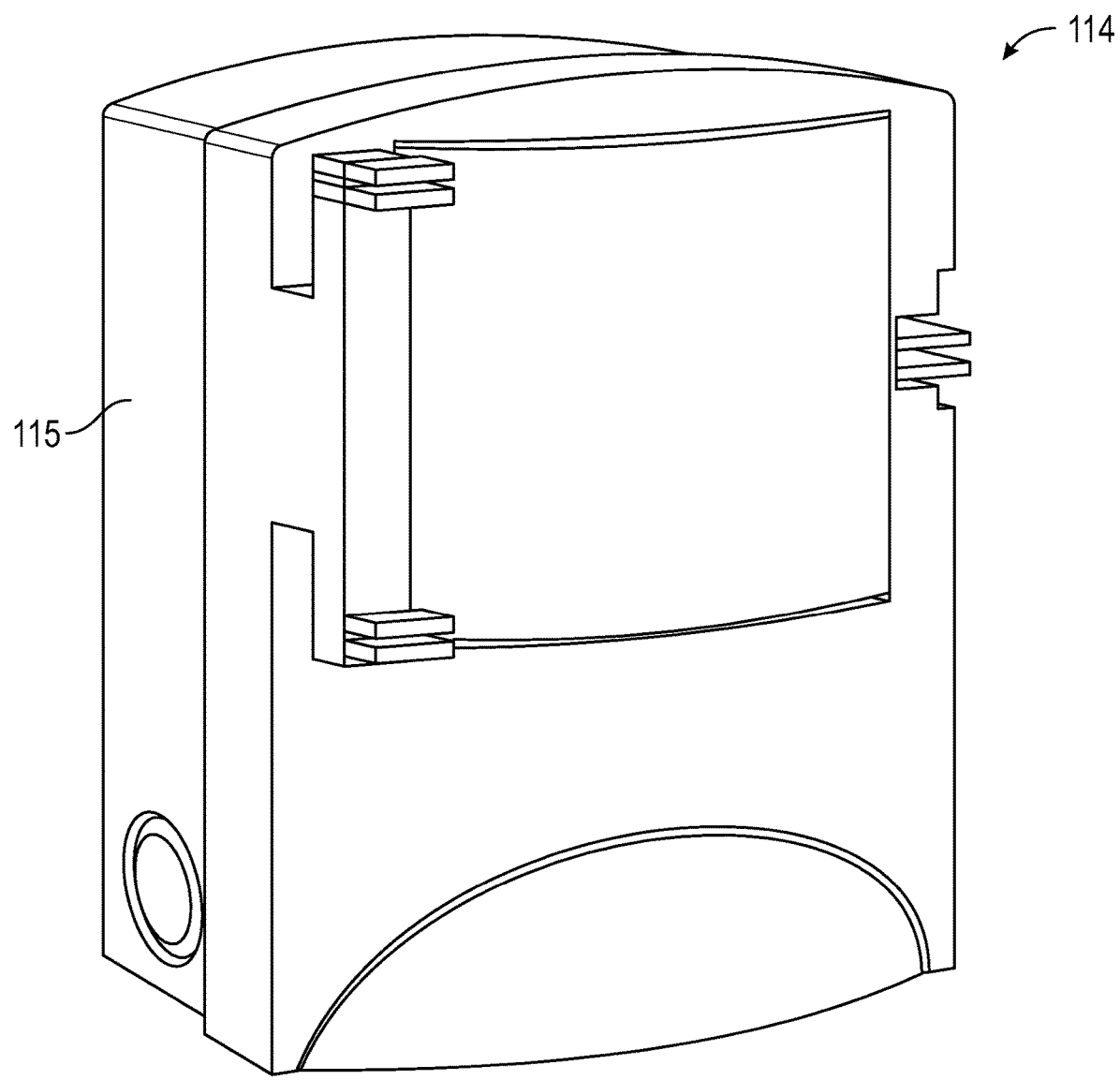
FIG. 5 is a perspective view depicting a protective cover portion of a DCLR, in accordance with an embodiment of the disclosure.

With reference to FIG. 5, a DLCR 114 is depicted in accordance with an embodiment of the disclosure. The DLCR 114 can include a rigid protective cover 115 configured to electrically isolate and protect the interior subcomponents of the DLCR 114. In some embodiments, the protective cover 115 can be constructed in compliance with Underwriters Laboratory Standard 2043 (UL2043), so as to have a peak rate of heat release of 100 kW or less, a peak normalized optical density of 0.50 or less, and an average normalized optical density of 0.15 or less.

In some embodiments, the DLCR 114 can control both legs of a 240 V power source, including both 30 A and 60 A options. The DLCR can further function as a Ground Fault Interrupter (GFI) configured to shut off electrical power in the event of a ground fault in as little as 1/40 of a second (e.g., in connection with pool pumps and hot tubs). For ease in installation and improved safety, the DLCR 114 can include an integrated terminal wiring block, thereby alleviating the need for wire nuts in the connection of the DLCR 114 between the distribution network 108 and the electrical power consuming load 112.

Figure 6:
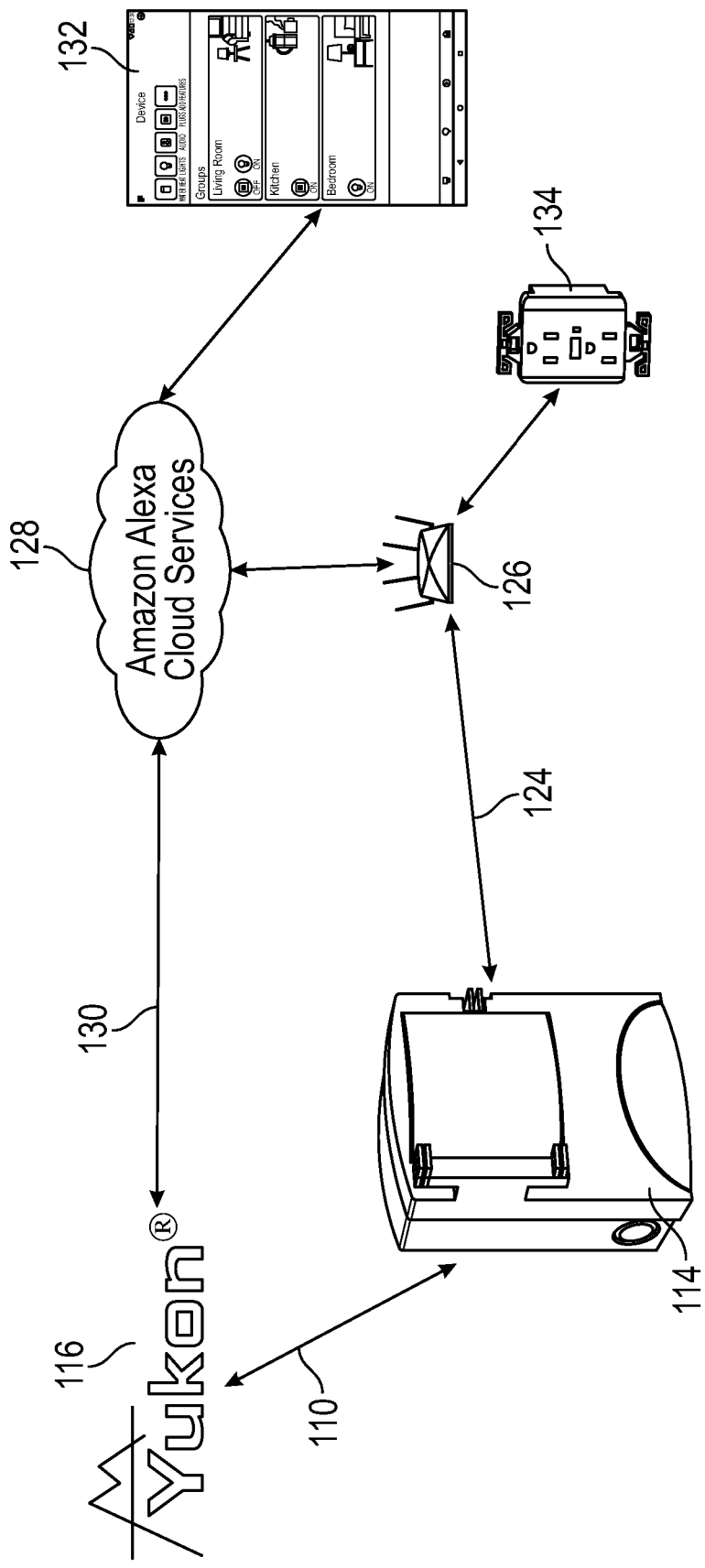
FIG. 6 is a schematic architectural view depicting a DCLR communications network, in accordance with an embodiment of the disclosure.

With reference to FIG. 6, the DLCR 114 can be can be built to universal code requirements, so as to communicate with a variety of controllers 116, by way of long-distance/long-haul communications network 110 to selectively interrupt or limit a flow of electrical power from the electrical power grid 102 to the load 112 in order to reduce energy demand, even when the load 112 calls for power to be applied. The long-haul two-way communication interface 110 protocol can include, but is not limited to ZigBee®, Cellular Cat-M1, an Itron® mesh network, radiofrequency node (RFN), VHF communications, and radiofrequency node (RFN) communications, among other communication protocols. In the embodiment shown, the controller 116 is Eaton Corporations' Yukon® Enterprise Software Platform; however, compatibility with other controllers is also contemplated.

In some embodiments, the DLCR 114 can additionally be configured to send and receive signals or commands over a short-haul network 124, for example to communicate with a wired or wireless router 126. The short-haul communications interface 124 protocol can include, but is not limited to Z-wave, Bluetooth® low energy (BLE), and wireless fidelity (WiFi), among other communication protocols. In some embodiments, the router 126 can be in communication with a cloud service 128 (e.g., Amazon's Alexa®), which can be configured to communicate with the controller 116 via a separate communication interface 130. A user interface 132 (e.g., via a portable computing device 516) can be provided to enable user feedback and (limited) control of the DLCR 114, as well as other optional consumer end devices 134 (e.g., smart outlets, etc.). In yet another embodiment the DLCR 114 operates locally without receiving external communications.

Figure 7:
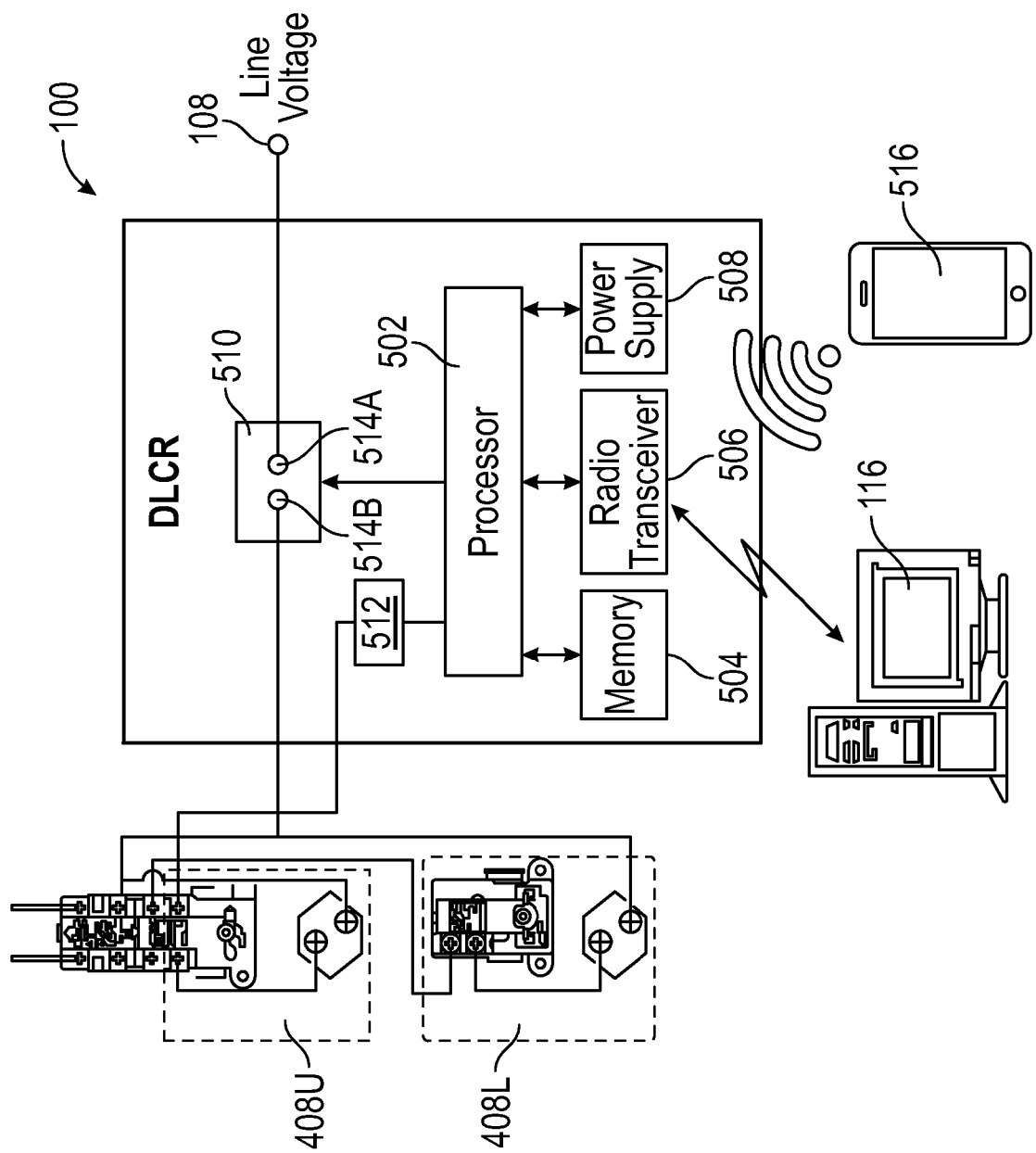
FIG. 7 is a block diagram of an electrical power distribution control system featuring various components of a disconnect load control receiver, in accordance with an embodiment of the disclosure.

With reference to FIG. 7, a block diagram of a DLCR 114 is depicted in accordance with an embodiment of the disclosure. In general, DLCR 114 can include a processor 502, memory 504, optional radio transceiver 506, power supply 508, load control switch 510, and sensing circuit 512. The processor 502 can include a processing unit, microprocessor, microcontroller, microcomputer, or any other such known processing device. Processor 502 can be in communication with the memory 504, radio transceiver 506, power supply 508, load control switch 510 and sensing circuit 512.

In one embodiment, the sensing circuit 512 can be in electrical communication with the upper and lower heating packages 408U/L of the resistive water heater 400 and can be configured to receive actual power consumption data, temperature setpoints, actual temperature information (e.g., $T_1$, $T_2$, etc.), and other operational data. In some embodiments, the sensing circuit 512 can be in continuous communication with the upper and lower heating packages 408U/L. In other embodiments, the sensing circuit can sample the operational data at sampling frequency $f_s$. In other simplified embodiments, sensing circuit 512 may not be present, or may merely comprise an electrical connection directly between the processor 502 and the upper and lower heating packages 408U/L, to sense a binary (e.g., on/off) supply of power to the water heater 400.

Memory 504, which may be a separate memory device or memory device integrated into processor 502, may comprise various types of volatile memory, including RAM, DRAM, SRAM, and so on, as well as non-volatile memory, including ROM, PROM, EPROM, EEPROM, Flash, and so on. In one embodiment, the memory 504 can be configured to store actual power consumption data received by the sensing circuit 512 for further processing. Additionally, the memory can be configured to store programs, software, and instructions relating to the operation of DLCR 114.

Radio transceiver 506 can be configured to send and receive the signals or commands to and from the controller 116 along long-distance/long-haul communications network 110, as well as to send and receive information from a portable computing device 516, electricity meter 120 and other electronic devices. Accordingly, in one embodiment, the radio transceiver 506 enables two-way communications between the outside world and DLCR 114. Power supply 508, receives power from an external power source and conditions the power to provide an appropriate power to processor 502, radio transceiver 506, and other components of DLCR 114 as needed.

Load control switch 510 can comprise an electrically operated switch, which in an embodiment can include a relay, such as a normally-closed single-pole, double throw relay switch. In addition to any of various types of known relays, load control switch 510 may comprise other types of switching devices. As depicted, load control switch 510 includes first terminal 514A and second terminal 514B. When load control switch 510 is closed, the first terminal 514A and second terminal 514B are electrically connected, thereby enabling electrical power to flow from the power distribution network 108 to the upper and lower heating packages 408U/L of the resistive water heater 400. Conversely, when the load control switch 510 is open, the first terminal 514A and second terminal 514B are electrically isolated, thereby inhibiting a flow of electrical power from the power distribution network 108 to the upper and lower heating packages 408U/L. In one embodiment, the load control switch 510 is driven by a control signal received from processor 502.

It should be noted that while a resistive water heater 400 is described at the electrical power consuming load 112A (as depicted in FIG. 2), any electrical power consuming load 112, such as an AC compressor, pool pump, and/or rechargeable battery for electric vehicles may be substituted for the resistive water heater 400, particularly where the limiting of a flow of electrical power to the power consuming load 112 would serve to benefit the electrical power grid 102 by reducing power demands while maintaining some degree of distributive control of a call for demand response to an individual residential customer that can be managed based on the period usage pattern of electrical loads for that customer.

Figure 8:
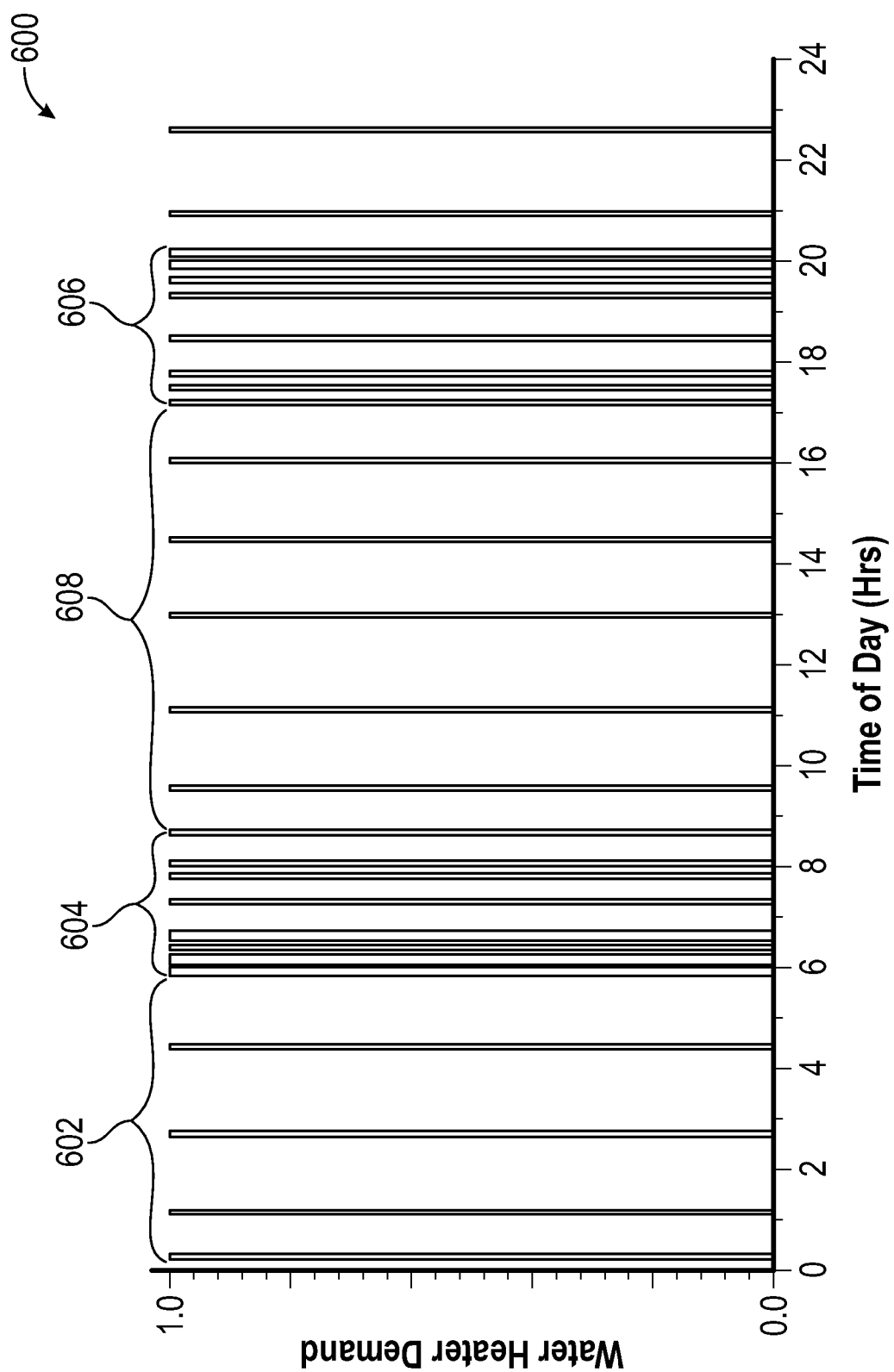
FIG. 8 is a graphical representation depicting operational data received by the sensing circuit of a disconnect load control receiver, in accordance with an embodiment of the disclosure.

In operation, the DLCR 114 is configured to measure actual power consumption data (and optionally other operational data) from the resistive water heater 400. FIG. 8 depicts a graphical representation of operational data 600 received by the sensing circuit 512, in accordance with an embodiment of the disclosure. As depicted, the y-axis represents a binary (e.g, on/off) use of energy by the resistive water heater 400, while the x-axis represents the time of day. In this particular example, the operational data 600 is comprised of data collected over a 24-hour period. As depicted, the water heater 400 is cycled on and off periodically throughout the day as hot water is demanded, as well as to occasionally reheat the water in the tank 402 as the water naturally cools over time. In general, the water heater 400 operates at a minimum energy usage 602 (e.g., cycles on briefly approximately every 90 minutes) during the night (e.g., between midnight and about 4 AM) and includes two peak energy usages during the day: a first peaks 604 occurring in the morning (e.g., between about 5 AM and about 8 AM), and a second peak 606 occurring in the evening (e.g. between about 5 PM and about 9 PM), with a second minimum energy usage 608 occurring between the first peak 604 and the second peak 606. It should be noted that the graphical representation of the operational data 600 represents one example embodiment; collection of operational data over other periods of time (e.g., less than or greater than 24-hour periods) and with other energy consumption patterns are also contemplated.

In one embodiment, the received operational data 600 can be stored in memory 504 for further processing by processor 502 and controller 116. Thereafter, the stored operational data can be used to generate a 24-hour power consumption demand model (alternatively referred to herein as a "historical runtime model") for the resistive water heater 400. For example, in one embodiment, the 24-hour power consumption demand model can be a moving average of the actual power consumption data 600, which can be periodically updated with newly received operational data over an equivalent length period of time (e.g., 24-hours). In one embodiment, the moving average can be a weighted moving average, where the newly received power consumption data collected over a more recent 24-hour period is weighted to place at least one of a greater or lesser importance to the recently collected power consumption data. For example, in one embodiment, newly received operational data can be multiplied by a fractional multiplier (e.g., 0.125), so as to reduce the likelihood of a sudden change to an established 24-hour power consumption demand model based on an unusual power consumption pattern during any given 24-hour period.

In alternative embodiments, curve fitting measures, statistical operations, or artificial intelligence algorithms can be applied to the received operational data 600 to generate the 24-hour power consumption demand model. In some embodiments, the operational data can be communicated to the controller 116 for generation of the 24-hour power consumption demand model. In other embodiments, the processor 502 can generate the 24-hour consumption demand model locally. Thereafter, either the processor 502 or controller 116 can use the 24-hour power consumption demand model to forecast an expected output consumer demand for the resistive water heater over a future 24-hour, in an attempt to ensure that the resistive water heater 400 produces a sufficient quantity of hot water to meet consumer demands over the 24-hour period, particularly when the DLCR limits a flow of electrical power to the resistive water heater 400 during the same 24-hour period (occasionally referred to herein as a "control event").

In some embodiments, in order to reduce the probability that the resistive water heater 400 will run out of hot water during a control event, either the processor 502 or controller 116 can compute a deferred run time limit, the quantity of run time (e.g., number of minutes) that normal operations can be deferred during a control event before the probability or likelihood that the water heater 400 will run out of hot water exceeds a defined threshold over the 24-hour period. For example, in an embodiment, the deferred run time limit can represent a computed maximum time delay permissible to achieve a minimum consumer satisfaction threshold (e.g., maintaining at least at least 5 gallons of water at a temperature $T_1$ of least 110° F. during all times when there is a greater than 50% chance that hot water may be demanded). Accordingly, in some embodiments, the selective limiting of the flow of electrical power to the resistive hot water heater 400 is constrained by the deferred run time limit.

In one embodiment, the deferred run time limit can be, at least in part, a function of the water heater tank 402 capacity, a difference between a desired water output temperature and a water source temperature, and a safety margin. For example, in one embodiment, the deferred run time limit (DRTL) can be computed according to the following formula:

$$DRTL = WHC \cdot (TS - GWT) \cdot 0.03257 \cdot (1 - SM)$$

Where WHC is the water heater capacity, TS is the thermostat setpoint, GWT is the groundwater temperature (e.g., cold water delivery temperature), SM is the percentage safety margin, and the constant of 0.03257 is equal to 8.337 lbs/gal, divided by 3413 BTU/kWh, divided by 4.5 kW, multiplied by 60 min/hr.

For example, a 52-gallon water heater with a difference between a desired water output temperature and a water source temperature of 75° F., and a safety margin of 20%, would yield a deferred run time limit of approximately 102 minutes. Accordingly, in one embodiment, electric power to the resistive water heater 400 could be limited by the DLCR 114 during any given 24-hour period, provided the electrical power is not limited more than 102 minutes prior to expected use, in order to ensure that at least a minimum quantity of water is heated to an established minimum temperature prior to an expected use of that minimum quantity of water.

Thereafter, the DLCR 114 can use the 24-hour power consumption demand model for the water heater 400 (e.g., representing a typical binary usage of energy over a 24-hour period), in combination with the deferred run time limit, to estimate how long the run time of the water heater 400 can be delayed, while still ensuring a sufficient quantity of hot water remains within the tank 402 when hot water is demanded by a consumer. Moreover, because the computed maximum delay in heating water within the tank 402 is based on the actual historical energy cycles by the water heater 400, each DLCR 114 is tailored to the specific usage patterns established by consumers of the hot water generated by the water heater 400. Accordingly, energy usage by the hot heater 400 can be delayed to times within the 24 hour period other than peak energy the usage times, while still assuring hot water delivery based on historical demand usage patterns.

As a further benefit, energy usage can be delayed or deferred to optimize or reduce the cost of energy consumed, by delaying energy usage to times during the day when the cost of energy is lowest (or at least lower than the current rate). Energy companies often establish a rate schedule setting a per-unit cost of energy over a 24-hour period several months in advance. In some embodiments, this rate schedule can be downloaded into the DLCR 114, for example via the radio transceiver 506 and processor 502. Thereafter, the 24-hour power consumption demand model for the water heater 400, computed deferred run time limit, and rate schedule can be used to delay energy usage to times during the 24-hour period when the per-unit cost of energy is lowest (referred to herein as "time of use optimization").

For example, in one embodiment, the DLCR 114 can be configured to reduce energy consumption costs by treating times of the day during which the cost of energy is highest as control events. That is, power to the water heater 400, as routed through the DLCR 114, can be continuously interrupted during times of the day with a high per-unit cost of energy, such that an energy demand in the water heater 400 builds up (e.g., in the form of cool water), which may be fulfilled at a later time when the per-unit cost of energy is lower. For example, in one embodiment, the DLCR 114 can be programmed to limit the water heater 400 from running on a high rate (based on the 24-hour power consumption demand model and deferred run time limit), until hot water in the water heater 400 has cooled below an established threshold or is about to run out. In one embodiment, the DLCR 114 can be programmed to maximize delays and minimize run time until the next per-unit energy rate is lower than the current per-unit energy rate, thereby where possible shifting energy consumption to the lowest possible per unit rate.

Figure 9:
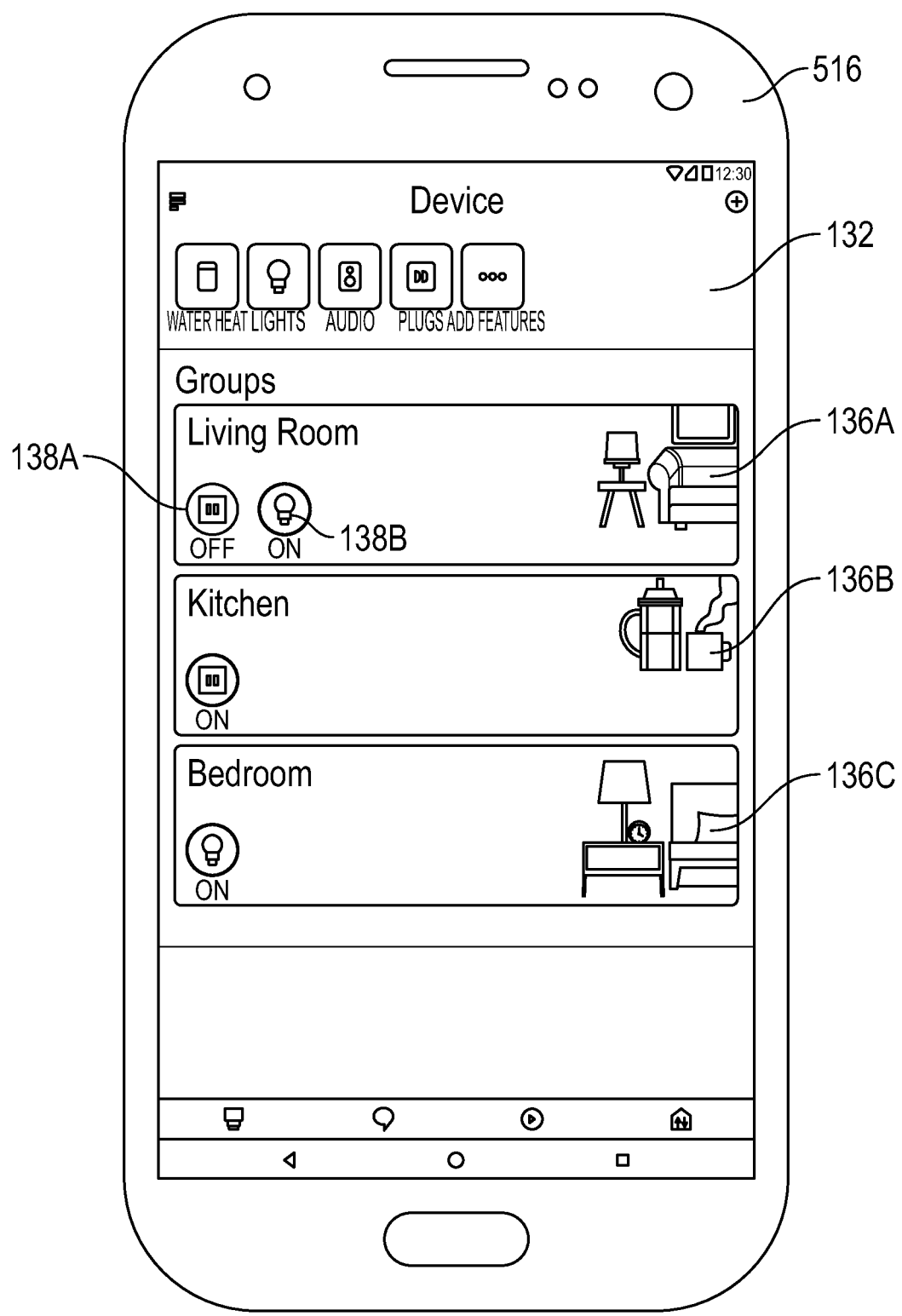
FIG. 9 is a graphical user interface configured to provide a user interactive portal enabling communications with the DCLR, in accordance with an embodiment of the disclosure.

As depicted in FIG. 9, in some embodiments, a user can use the user interface 132 (e.g., via a mobile computing device 516, such as a cellular telephone, tablet, portable computer, smart speaker, etc.) to provide feedback to the DLCR 114 as an aid in computing the deferred run time limit. For example, in one embodiment, a consumer can verbally provide inputs to a smart speaker in connection with an artificial intelligence unit (e.g., Google®, Alexa®, etc.) to assist in programming of the DLCR 114. In one embodiment, a user can adjust the safety margin, either up or down, depending upon the needs of the user. For example, if a user experiences an event where the hot water heater 400 runs out of hot water either during or shortly after a control event, the user can step up the safety margin to decrease the likelihood of a repeat occurrence of the hot water heater 400 running out of hot water. As depicted, to promote organization and efficiency in user control, in some embodiments, portions of the residence can be broken up into distinct groups 136A-C (e.g., a living room, kitchen, bedroom, etc.) with icons 138A-B representing various electrical devices and interfaces (e.g., outlets, lights, individual loads, appliances, recharging stations, etc.).

In an embodiment, a user can use the user interface 132 to adjust the thermostat setpoint to reflect the current and future needs of a user. For example, if a user is planning to be out of town for the weekend, the user can decrease the thermostat setpoint to a lower maintenance threshold (e.g., 45° F.) for the period of time in which the user no plans to use hot water from the water heater 400. Thereafter, the thermostat setpoint can default back to the previously established thermostat setpoint to ensure that water within the tank 402 is heated to the thermostat setpoint before the user returns. In another embodiment, the user can modify the 24-hour power consumption demand model to reflect known times during current or future 24-hour periods where a minimum consumer satisfaction threshold (e.g., a minimum acceptable water temperature) need not be met, and the resistive water heater 400 can be operated according to the lower maintenance threshold.

To promote a more efficient use of renewable resources, in some embodiments, the system 100 can use the water in the tank 402 as an energy storage device, thereby effectively storing the energy produced by DERs during their peak production hours for use later in the day. That is, in one embodiment, 24-hour power consumption demand model for the water heater 400, computed deferred run time limit, and alternative demand curve can be used to selectively delay or interrupt power supply to the water heater 400 to strategically build up an energy demand in the water heater builds up (e.g., in the form of cool water), which may be fulfilled during peak renewable energy production. For example, in one embodiment, the DLCR 114 can be programmed to selectively defer energy usage (e.g., increase the deferred run time), with the goal of achieving a maximum depletion (e.g., highest energy demand called for by the water heater 400) prior to peak energy supply times within a 24-hour period. The DLCR 114 can then cycle on power to the water heater 400, with the overall effect of consuming the excess energy produced by DERs in an efficient way while smoothing the overall demand curve across the 24-hour period.

In one embodiment, the system 100 can compute a control rate to determine to determine how many hours in advance of an anticipated consumer need the water should be heated. For example, in one embodiment, the control rate can be computed according to the following formula:

Control Rate=1−((DRTL+FRHR)·PV Load)/60

Where DRTL is the deferred run time limit (as defined above), FRHR is the forecast restore hours runtime, and PV load is the anticipated hourly PV load by percentage. In this example, if the runtime deferral is 83 minutes, the forecast restore hours runtime is 42 minutes and the total the hourly PV load % is 20%, then the restore control rate is approximately 58%. In other embodiments, the DLCR 114 can implement a variety of other load-shedding and load-control algorithms, including known algorithms, such as those described in U.S. Pat. Nos. 7,355,301, 7,242,114, 7,702,424, 7,528,503, 7,869,904, and U.S. Pat. Publ. Nos. 2013/0125572 and 2016/0010879, assigned to the assignee of the present application, and incorporated by reference herein in their entireties.

In another embodiment, DLCR 114 can be configured to selectively heat water in the tank 402 to a defined maximum safe water output temperature in advance of a control event to meet an expected output consumer demand during or shortly after a control event. For example, if is it expected that at least 15 gallons of water at least 115° F. will be needed at 7 PM (i.e., during an anticipated peak power consumption), it may be advantageous heat the water in the tank 402 above the normal thermostat setpoint to a higher temperature (e.g., 160° F.) to take advantage of lower cost, more readily available power in advance of the anticipated peak power consumption event (provided that the higher temperature does not exceed established safety standards). In some embodiments, the processor 502 or controller 116 can employ an algorithm to anticipate cooling of the water within the tank 402 to determine the temperature to which the water should be heated prior to the control event. That is, in an embodiment the processor 502 or controller 116 can be configured to selectively heat water in the tank 402 to a defined maximum safe water output temperature during an anticipated peak production cycle of one or more DER 122, particularly where it may be beneficial to limit a flow of electrical power to the resistive water heater 400 at or near the time when a demand for hot water is anticipated.

Figure 10:
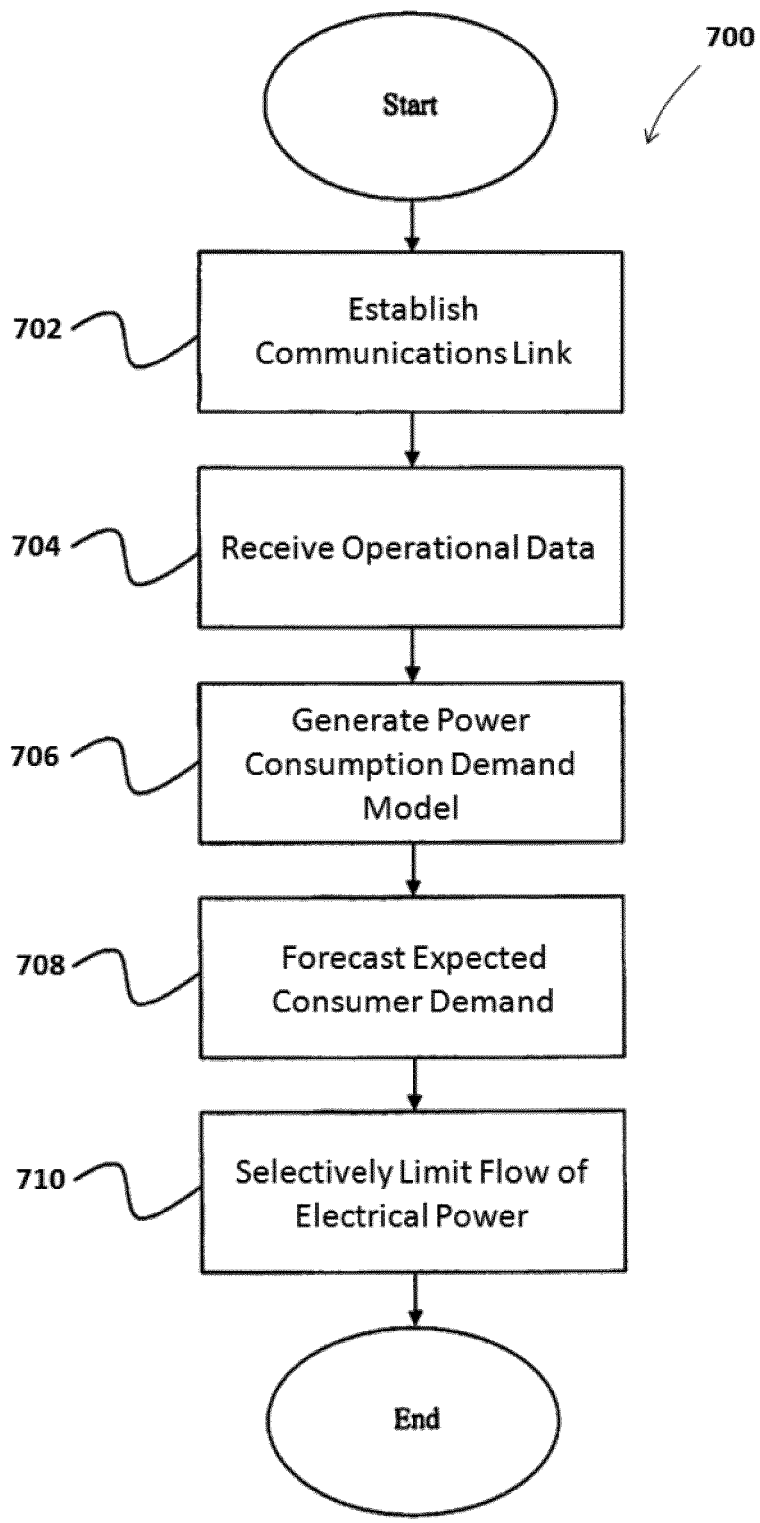
FIG. 10 is a flowchart depicting a method of reducing peak power demand within an electrical power grid via an electrical power distribution control system, in accordance with an embodiment of the disclosure.

Referring to FIG. 10, a method 700 of reducing peak power demand within electrical power grid 102 via an electrical power distribution control system 100 is depicted in accordance with an embodiment of the disclosure. At 702, a communications link can be established between at least one DLCR 114 and a controller 116, wherein the DLCR 114 is operably coupled to at least one load 112 within the electrical power grid 102. At 704, operational data from the at least one load 112 can be received by the DLCR 114. At 706, the received operational data can be used to generate a 24-hour power consumption demand model for the least one load 112. At 708, at least one of the DLCR 114 or controller 116 can forecast an expected consumer demand for the at least one load 112 over the 24-hour period. At 710, the DLCR 114 can be instructed to selectively limit a flow of electrical power to the at least one load to meet the expected output consumer demand over the 24-hour period.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

It should be understood that the specific embodiments described herein relate primarily to water heaters, but similar systems could be implemented based on any other system that can store power, in particular thermal reserves or other storage systems that can be pre-conditioned to smooth the demand curve. Similar systems could be used that are based on the charging times or rates of electric vehicles, the heating and/or needs of an interior space, and the water circulation and are heating up pool systems.

Various software systems can be implemented to control the thermal reserves corresponding to electrical loads that fall within the scope of this invention. For example, an HVAC or water heater control system can be connected to a wired or wireless network that permits access to the control system from a server or cloud in some embodiments. In these embodiments, the temperature and voltage set points for the system can be controlled, either by the user of the hot water or by the utility that operates the electrical grid. Firmware can be used to add timers, counters, delays, and/or other parameters and features to modify the functionality of the heater. These parameters can include the over voltage level, the normal voltage level, the normal voltage temperature settings, and the over voltage temperature settings. In embodiments having such software, the controller can include a processor, antenna, and/or other features necessary to communicate with a mobile device, wired or wireless network, or smartphone.

The systems and methods of operating them described above can result in benefits to both the user of the hot water and the utility company. These benefits include reduced power prices, increased capacity to add DER power sources to the grid, and reduction of the inconvenience of conventional demand response systems. As use of such systems increases their ability to store excess power and their ability to smooth the overall power usage on the grid increases, thereby increasing their value to utilities and customers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An electrical power distribution control system configured to issue a demand response signal to reduce power to a plurality of electrical power consuming loads within an electrical power distribution network to reduce a peak power demand within an electrical power grid while permitting distributive timing control of individual loads in responding to the demand response signal, the electrical power distribution control system comprising:
   at least one disconnect load control receiver (DLCR) operably coupled to at least one resistive heating load of the plurality of electrical power consuming loads within the electrical power grid; and
   a utility operated controller configured to communicate a demand response signal to the at least one DLCR to reduce power to the plurality of electrical power consuming loads to reduce the peak power demand within the electrical power grid,
   wherein the at least one DLCR is configured to monitor actual power consumption data of the at least one resistive heating load of the plurality of electrical consuming loads and generate a 24-hour power consumption demand model for the at least one resistive heating load,
   wherein the DLCR is configured to selectively delay the demand response signal to manage a flow of electrical power to the at least one resistive heating load based on the 24-hour power consumption demand model,
   wherein the DLCR uses the 24-hour power consumption demand model to forecast an expected output consumer demand for the at least one resistive heating load over a 24-hour period, and
   wherein the management of the flow of electrical power to the at least one resistive heating load is constrained by a deferred runtime limit, the deferred runtime limit representing a computed time delay permissible to achieve a consumer satisfaction threshold of the at least one resistive water heater over the 24-hour period.

2. The electrical power distribution control system of claim 1, wherein the at least one resistive heating load is at least one of a resistive water heater and a resistive pool heater.

3. The electrical power distribution control system of claim 1, wherein the at least one resistive heating load is a resistive water heater, and the consumer satisfaction threshold is configured such that the resistive water heater continuously maintains a desired water output temperature of at least an established temperature over the 24-hour period.

4. The electrical power distribution control system of claim 1, wherein the deferred runtime limit is, at least in part, a function of a water heater capacity, a difference between a desired water output temperature and a water source temperature, and a consumer adjustable safety margin.

5. The electrical power distribution control system of claim 4, wherein the consumer adjustable safety margin is adjustable via a mobile computing device.

6. The electrical power distribution control system of claim 1, wherein the DLCR is configured to selectively defer energy usage to a lower cost per unit time during a 24-hour period.

7. The electrical power distribution control system of claim 1, wherein the electrical power grid further includes one or more distributed energy resource configured to generate an additional supply of electrical power, and wherein the DLCR is configured to selectively defer energy usage to artificially create an energy demand during times of excess power generation within the electrical power grid.

8. The electrical power distribution control system of claim 1, wherein the 24-hour power consumption demand model generated by the DLCR is a moving average of the actual power consumption data collected over a plurality of 24-hour periods.

9. The electrical power distribution control system of claim 8, wherein the moving average is a weighted moving average, and wherein the actual power consumption data collected over a recent 24-hour period is weighted relative to the actual power consumption data collected over the recent 24-hour period.

10. The electrical power distribution control system of claim 1, wherein the at least one DLCR is housed in a rigid protective cover configured to electrically isolate and protect the interior subcomponents of the DLCR, and wherein the DLCR can be configured to control both legs of a power source at multiple amperage options and further includes a Ground Fault Interrupter (GFI) configured to shut off electrical power in the event of a ground fault.

11. An electrical power distribution control system configured to regulate at least one resistive water heater to reduce power consumption within an electrical power grid during a peak power demand, the electrical power distribution control system comprising:
 a plurality of disconnect load control receivers (DLCRs) operably coupled to a corresponding plurality of resistive water heaters; and
 a utility operated controller, remotely located from the DLCRs, configured to communicate with each of the DLCRs to provide a demand response control signal,
 wherein each of the DLCRs is configured to generate actual power consumption data of its respective resistive water heater for the generation of a 24-hour power consumption demand model for each resistive water heater,
 wherein one of the controller and the plurality of DLCRs is configured to use 24-hour power consumption demand model to forecast an expected output consumer demand for each resistive water heater over a 24-hour period such that the DLCRs on an individual basis selectively manage a flow of electrical power its respective resistive water heater to meet the expected output consumer demand over the 24-hour period, while reducing power consumption within the electrical power grid during a peak power demand, and
 wherein the selective managing of the flow of electrical power to the at least one resistive water heater is constrained by a deferred runtime limit, the deferred runtime limit representing a time delay permissible to achieve a consumer satisfaction threshold of the at least one resistive water heater over the 24-hour period.

12. The electrical power distribution control system of claim 11, wherein the consumer satisfaction threshold is configured such to continuously maintain a desired water output temperature of at least an established temperature over the 24-hour period.

13. The electrical power distribution control system of claim 11, wherein the deferred runtime limit is, at least in part, a function of a water heater capacity, a difference between a desired water output temperature and a water source temperature, and a consumer adjustable safety margin.

14. The electrical power distribution control system of claim 13, wherein the consumer adjustable safety margin is adjustable via a mobile computing device.

15. The electrical power distribution control system of claim 11, wherein the utility operated controller is configured to selectively defer energy usage to a lower cost per unit time during a 24-hour period.

16. A method of reducing a peak power demand within an electrical power grid, comprising:
 establishing a communication link between at least one disconnect load control receiver (DLCR) and a controller, the DLCR operably coupled to at least one resistive heating load within the electrical power grid;
 receiving actual power consumption data of the at least one resistive heating load from the DLCR;
 generating of a 24-hour power consumption demand model based on the received actual power consumption data;
 forecasting an expected output consumer demand for the at least one resistive heating load over a 24-hour period;
 causing the DLCR, in response to a demand response signal from the remotely located utility operated controller, to selectively delay a flow of electrical power to the at least one resistive load to reduce power consumption within the electrical power grid during a peak power demand by managing a flow of electrical power to the at least one resistive heating load based on the 24-hour power consumption demand model, wherein the selective delay of the flow of electrical power to the at least one resistive water heater is constrained by a deferred runtime limit, the deferred runtime limit representing a time delay permissible to achieve a consumer satisfaction threshold of the at least one resistive water heater over the 24-hour period.

17. A disconnect load control receiver (DLCR) comprising:
 a load control switch configured to control electrical power flow to one or more resistive loads;
 a sensing circuit configured to receive power consumption data from the one or more resistive loads;
 a communications interface configured to communicate with a utility-operated controller;
 an electronic processor; and
 an electronic memory coupled to the electronic processor, the electronic memory storing instructions that, when executed, cause the electronic processor to:
  generate a 24-hour power consumption demand model for one or more resistive loads based on the power consumption data from the one or more resistive loads; and
  control the load control switch to manage the electrical power flow to the one or more resistive loads based on the 24-hour power consumption demand model, wherein the management of the flow of electrical power to the one or more resistive water heaters is constrained by a deferred runtime limit, the deferred runtime limit representing a time delay permissible to achieve a consumer satisfaction threshold of the at least one resistive water heater over the 24-hour period.

18. The disconnect load control receiver of claim 17, wherein the management of the electrical power flow to the one or more resistive loads is in response to a demand response signal received from the remote utility-operated controller.

19. The disconnect load control received of claim 18, wherein the instructions further comprise instructions that, when executed, override the demand response signal if the consumer satisfaction threshold is not achieved.

20. The disconnect load control receiver of claim 18, wherein the communications interface is configured to communicate with a computing device associated with a consumer, and the consumer satisfaction threshold is configured to be edited by the computing device.

21. The disconnect load control receiver of claim 17, further comprising: a Ground Fault Interrupter (GFI) configured to shut off electrical power in the event of a ground fault; and a rigid cover, and wherein the DLCR can be configured to control both legs of a power source at multiple amperage options.

* * * * *